United States Patent
Handshaw et al.

(10) Patent No.: US 10,817,690 B2
(45) Date of Patent: Oct. 27, 2020

(54) INDUSTRIAL DIGITAL BARCODE SCANNER

(71) Applicant: ZEBRA TECHNOLOGIES CORPORATION, Lincolnshire, IL (US)

(72) Inventors: Darran Michael Handshaw, Sound Beach, NY (US); Steven D. Sieckowski, Port Jefferson, NY (US); Wancheng Zhao, St. James, NY (US); Jason Y. Potter, New York, NY (US); Edward Anthony Hackett, Surbiton (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/245,969

(22) Filed: Jan. 11, 2019

(65) Prior Publication Data

US 2020/0226330 A1 Jul. 16, 2020

(51) Int. Cl.
*G06K 7/10* (2006.01)
*G06K 7/04* (2006.01)

(52) U.S. Cl.
CPC ............. *G06K 7/109* (2013.01); *G06K 7/04* (2013.01); *G06K 7/1098* (2013.01)

(58) Field of Classification Search
CPC ..... G06K 7/10693; G06K 7/14; G06K 10/881
USPC ............ 235/462.01, 454, 375, 462.14, 462.2
See application file for complete search history.

(56) References Cited

U.S. PATENT DOCUMENTS

| | | | |
|---|---|---|---|
| 5,726,434 A | 3/1998 | Seo | |
| 7,051,940 B2 | 5/2006 | Tamburrini et al. | |
| D735,197 S * | 7/2015 | Fukuba | ........................ D14/420 |
| 2005/0224583 A1* | 10/2005 | Tamburrini | ........ G06K 7/10693 |
| | | | 235/472.01 |
| 2006/0180670 A1* | 8/2006 | Acosta | ............... G06K 7/10732 |
| | | | 235/462.31 |
| 2008/0302873 A1* | 12/2008 | Kotlarsky | ........... G06F 9/44526 |
| | | | 235/462.15 |
| 2013/0311314 A1* | 11/2013 | Fernando | ................. G06K 7/01 |
| | | | 705/17 |
| 2016/0357999 A1 | 12/2016 | Hsieh et al. | |

FOREIGN PATENT DOCUMENTS

EP 0478372 A2 4/1992

OTHER PUBLICATIONS

Office Action for United Kingdom Patent Application No. 2000219.2 dated Jul. 29, 2020.

* cited by examiner

*Primary Examiner* — Edwyn Labaze
(74) *Attorney, Agent, or Firm* — Yuri Astvatsaturov (57) ABSTRACT

A barcode scanner assembly for capturing at least one object appearing in a field of view (FOV) is provided that includes a base defining a curved base surface and a scanner enclosure being mechanically coupled to the base. The scanner enclosure includes a top portion and a bottom portion opposite the top portion. The bottom portion of the scanner enclosure is positioned proximate to the base. The bottom portion of the scanner enclosure includes a curved scanner enclosure surface. The curved base surface and the curved scanner enclosure surface are nested such that a clearance of less than approximately 5 mm is formed between the curved base surface and the curved scanner enclosure surface.

6 Claims, 7 Drawing Sheets

INDUSTRIAL DIGITAL BARCODE SCANNER

BACKGROUND OF THE INVENTION

Barcode and other scanning devices generally capture images within a given field of view (FOV). In some instances, handheld devices may be used to capture images of objects positioned at varying distances from the device. In such environments, handheld devices may be selectively positioned by a user to assist with capturing a suitable image of the object. Such systems typically include a rotational positioning mechanism that allows a portion of the scanning device to move in order to position the FOV to capture images of desired objects. Some of these positioning systems may be unreliable and thus unsuitable for extended use cycles, and may have exposed components that are exposed to the elements (e.g., dirt and grime) which may lead to interfering with operation of the positioning mechanism. Further, existing mechanisms may include gaps between materials in which a user's hand may be pinched.

Accordingly, there is a need for improved systems, methods, and devices which address these issues.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In an embodiment, the present application provides a barcode scanner assembly for capturing at least one object appearing in a field of view (FOV) that includes a base defining a curved base surface and a scanner enclosure being mechanically coupled to the base. The scanner enclosure includes a top portion and a bottom portion opposite the top portion. The bottom portion of the scanner enclosure is positioned proximate to the base. The bottom portion of the scanner enclosure includes a curved scanner enclosure surface. The curved base surface and the curved scanner enclosure surface are nested such that a clearance of less than approximately 5 mm is formed between the curved base surface and the curved scanner enclosure surface. In some examples, the curved base surface is convex and the curved scanner enclosure surface is concave. In other examples, the curved base surface is concave and the curved scanner enclosure surface is convex.

In another implementation, a barcode scanner assembly for capturing at least one image of an object appearing in a field of view (FOV) includes a base including a first cylindrically shaped surface being cylindrical about a base axis and a scanner enclosure being mechanically coupled to the base. The scanner enclosure includes a top portion and a bottom portion opposite the top portion, where the bottom portion of the scanner enclosure is positioned proximate to the base. The bottom portion of the scanner enclosure includes a second cylindrically shaped bottom surface being cylindrical about a scanner enclosure axis. The base axis and the scanner enclosure axis are one of coaxial or positioned within approximately 5 mm of each other. In some approaches, the scanner enclosure may include a front housing and a rear housing coupled to the front housing.

In some aspects, the base is coupled to the scanner enclosure via a mechanical linkage. The mechanical linkage can include a frictional and/or a ratchet component. In some forms, the ratchet component is disposed in at least one of the scanner enclosure or the base. The mechanical linkage may additionally include a trough dimensioned to accommodate a connection cable.

In other aspects, the base axis and the scanner enclosure axis pass through one of the scanner enclosure, the base, or a volume below the base. The first cylindrically shaped surface may be concave, and the second cylindrically shaped surface may be convex. Conversely, the first cylindrically shaped surface may be convex, and the second cylindrically shaped surface may be concave.

In another implementation, the present disclosure includes a barcode scanner assembly for capturing at least one image of an object appearing in a field of view (FOV) that includes a base including a first generally spherically shaped surface being spherical about a base center point and a scanner enclosure being mechanically coupled to the base. The scanner enclosure includes a top portion and a bottom portion opposite the top portion, where the bottom portion of the scanner enclosure is positioned proximate to the base. The bottom portion of the scanner enclosure includes a second generally spherically shaped bottom surface being spherical about a scanner enclosure center point. The base center point and the scanner enclosure center point are one of concentric or positioned within approximately 5 mm of each other.

In yet another implementation, a barcode scanner assembly for capturing at least one image of an object appearing in a field of view (FOV) includes a base including a front portion, a rear portion, and a mechanical linkage extending from the rear portion of the base at an upward angle and defining a linkage axis. The assembly further includes a scanner enclosure being mechanically coupled to and pivotable about the linkage axis the base that includes a top portion, a bottom portion opposite the top portion, a front portion, and a rear portion. The bottom portion of the scanner enclosure is positioned proximate to the base, and the bottom portion of the scanner enclosure includes an aperture configured to receive the mechanical linkage. The aperture of the bottom portion of the scanner enclosure is defined by an aperture wall that extends approximately 50° forward of the mechanical linkage with the linkage axis being a vertex.

In another implementation, a barcode scanner assembly for capturing at least one image of an object appearing in a field of view (FOV) includes a base having at least one upright wall extending from a bottom portion of the base to a top portion of the base and a mechanical linkage extending from a rear portion of the base and defining a linkage axis. The assembly further includes a scanner enclosure being mechanically coupled to the base and pivotable about the linkage axis that includes a top portion and a bottom portion opposite the top portion. The scanner enclosure has one of a cylindrically shaped bottom surface or a generally spherically shaped bottom surface and is positioned proximate to the at least one upright wall. The at least one upright wall terminates within approximately 5 mm of the one of the cylindrically shaped bottom surface or the generally spherically shaped bottom surface.

Turning to the figures, reference numeral 10 generally identifies an imaging reader configured as a brick-shaped housing having a base 11 defining a base body 12 and a scanner enclosure 30 that is mechanically coupled to the base 11. The base body 12 includes an upper portion 12a, a lower portion 12b, a front portion 12c, and a rear portion 12d. The lower portion 12b of the base body 12 is generally flat to accommodate placement on a substantially horizontal surface (e.g., a countertop or table). The base body 12 may be constructed from any number of suitable materials such as, for example, polymers and/or metallic materials. Other examples are possible.

Figure 5:
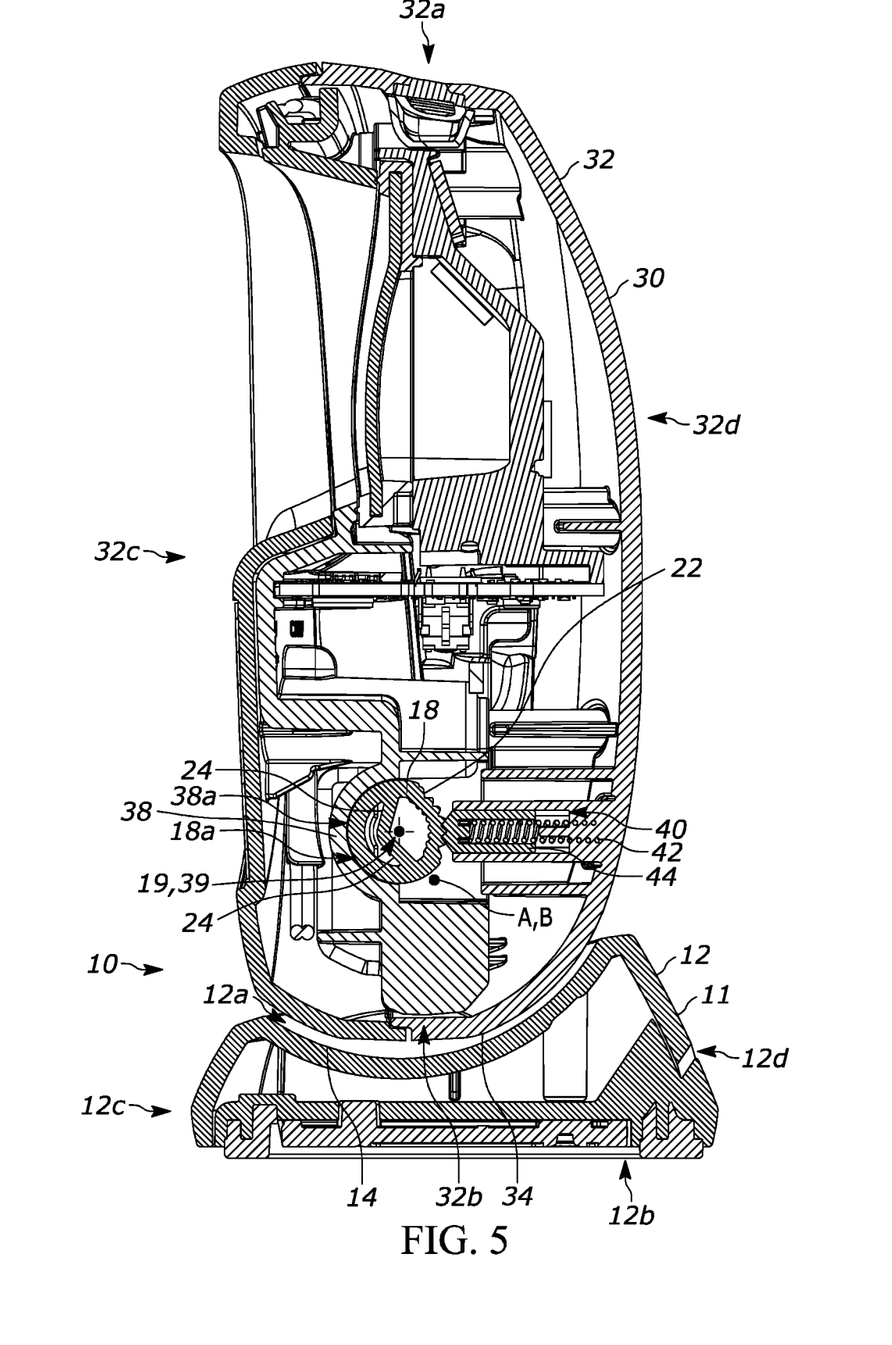
FIG. 5 is a first side elevation cross-sectional view of the digital barcode scanner of FIGS. 1-4 illustrating a portion of a mechanical linkage between the base and the scanner in accordance with this disclosure.
Figure 6:
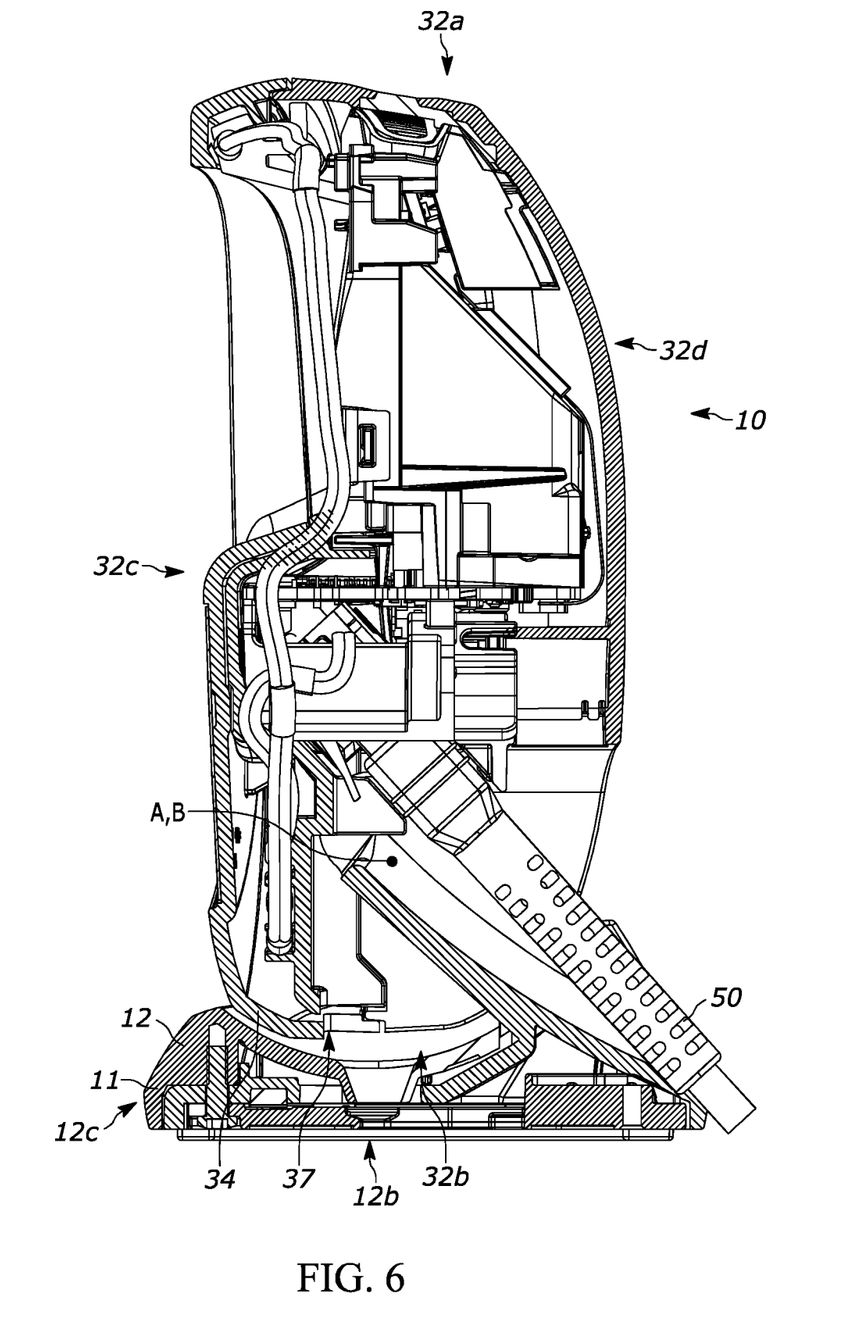
FIG. 6 is a second side elevation cross-sectional view of the digital barcode scanner of FIGS. 1-5 illustrating a cutout formed in the shell enclosure to accommodate the mechanical linkage in accordance with this disclosure.

The upper portion 12a of the base 11 further defines a curved base surface 14. In the illustrated example, the curved base surface 14 is generally spherical, and thus is spherical about a base center point "A" (FIGS. 5 and 6). However, in other examples, the curved base surface 14 may be generally cylindrical, and thus is cylindrical about a base axis. In some examples, the curved base surface 14 may define a weep hole 15 positioned at or near a lowest point thereof.

Figure 3:
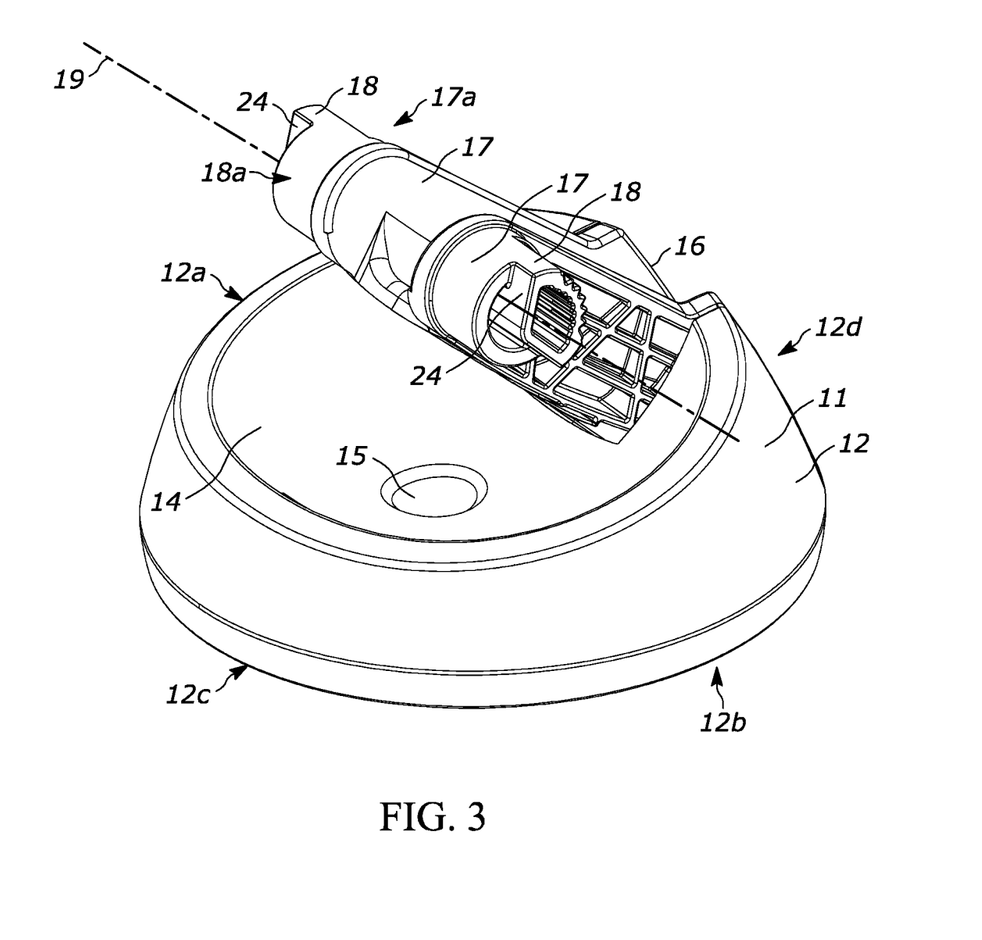
FIG. 3 is a front perspective view of the base of FIGS. 1 and 2 in isolation in accordance with this disclosure.
Figure 4:
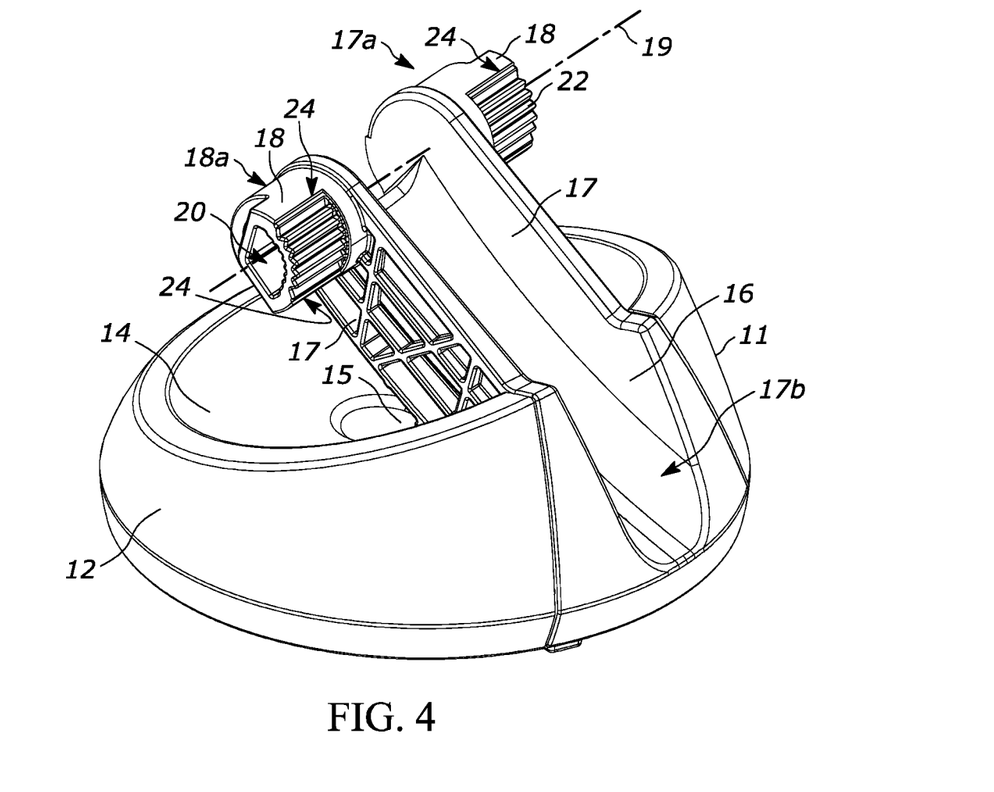
FIG. 4 is a rear perspective view of the base of FIGS. 1 and 2 in isolation in accordance with this disclosure.

As illustrated in FIGS. 3 and 4, the base 11 carries a mechanical linkage 16 which, in some examples, may be operably coupled to the base body 12, and in other examples, may be formed integrally therewith. Specifically, the mechanical linkage 16 may be in the form of two arms 17 extending upwardly from the rear portion 12c of the base body 12 at a desired angle relative to a horizontal plane and/or the lower portion 12b of the base body 12. For example, the mechanical linkage 16 may extend upwardly from the base body 12 at an angle between approximately 40° and approximately 50° relative to a longitudinal axis of the scanner enclosure body. Other examples are possible.

Additional details of the mechanical linkage 16 will be discussed in further detail below.

As previously noted, the scanner enclosure 30 is mechanically coupled to the base 11 (for example, by way of the mechanical linkage 16). The scanner enclosure 30 is defined by an enclosure body 32 that has a top portion 32a, a bottom portion 32b opposite the top portion 32a, a front portion 32c, and a rear portion 32d opposite the front portion 32c. The front and rear portions 32c, 32d of the enclosure body 32 may be in the form of front and rear housings or clamshell members that operably secure to each other using any number of suitable approaches (e.g., fasteners, frictional and/or slotted engagement members, etc.).

In the illustrated example, the bottom portion 32b of the enclosure body 32 is positioned proximate to the base 11, and defines a curved scanner enclosure surface 34. In the illustrated example, the curved scanner enclosure surface 34 is generally spherical, and thus is spherical about a scanner enclosure center point "B" (FIGS. 5 and 6). However, in other examples, the curved scanner enclosure surface 34 may be generally cylindrical, and thus is cylindrical about a scanner enclosure axis. It is understood that in some examples, the entire curved scanner enclosure surface 34 needn't be generally spherical (or cylindrical), rather, only a portion of this surface may be generally spherical (or cylindrical).

Figure 1:
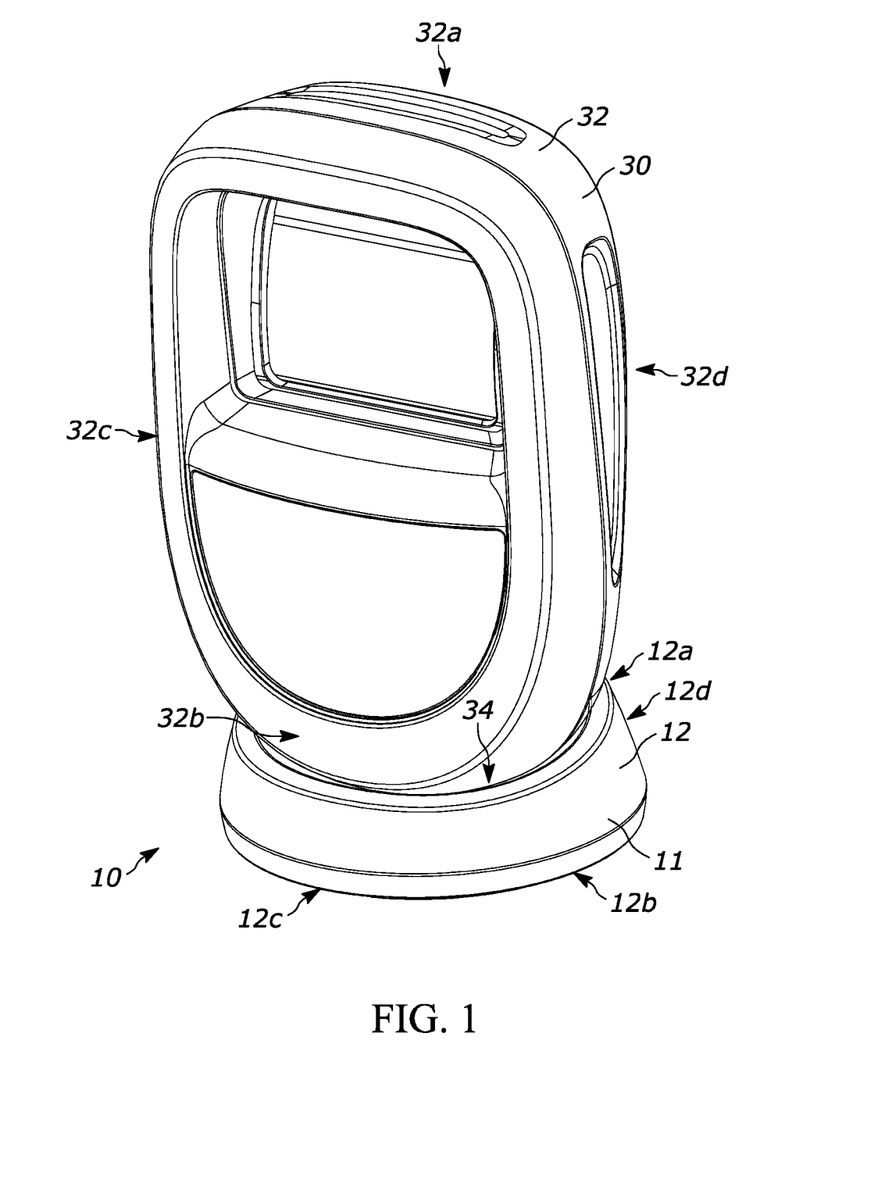
FIG. 1 is a front perspective view of a portable, handheld digital barcode scanner having a base and a scanner enclosure in accordance with this disclosure.
Figure 2:
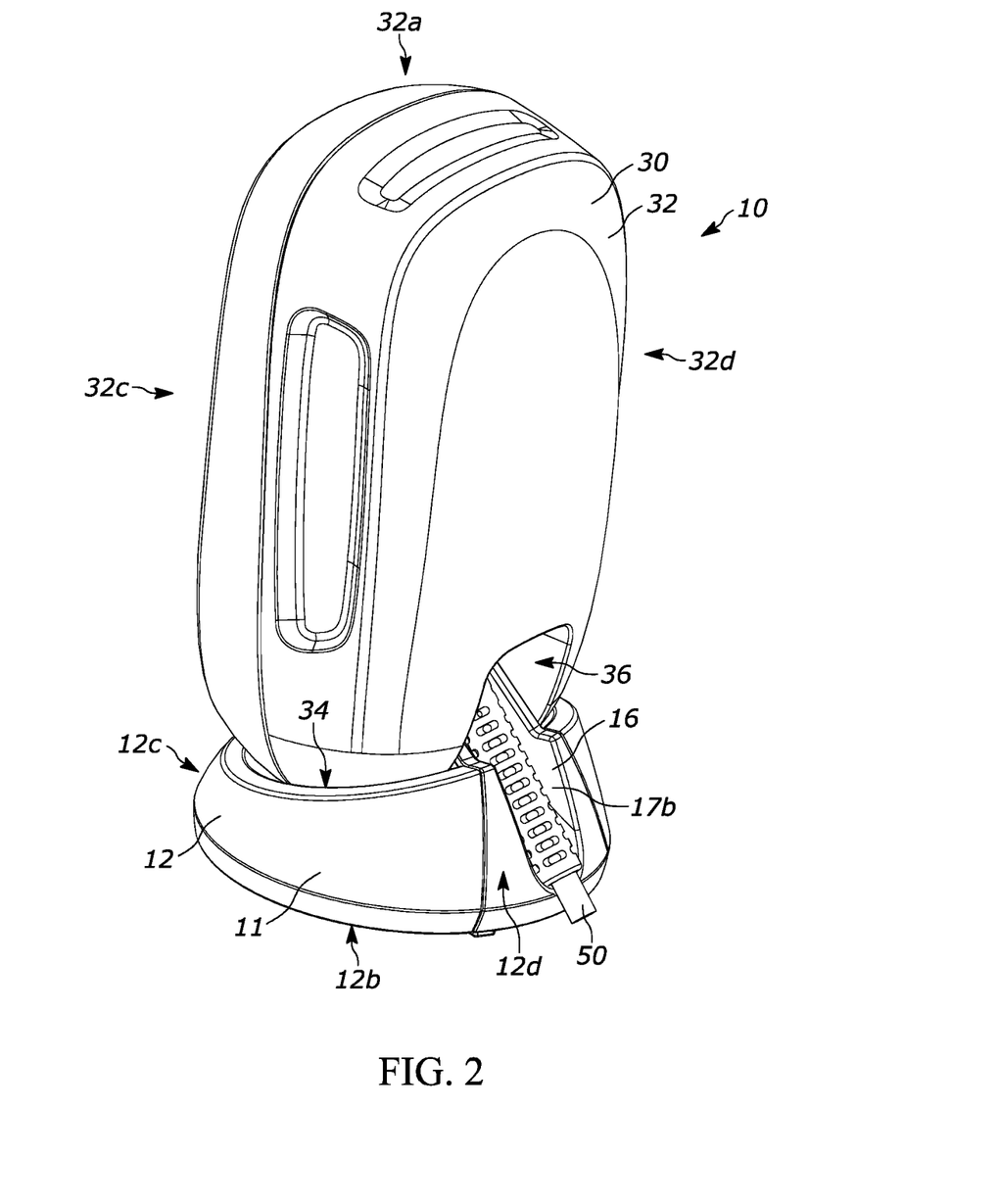
FIG. 2 is a rear perspective view of the digital barcode scanner of FIG. 1 in accordance with this disclosure.
Figure 7:
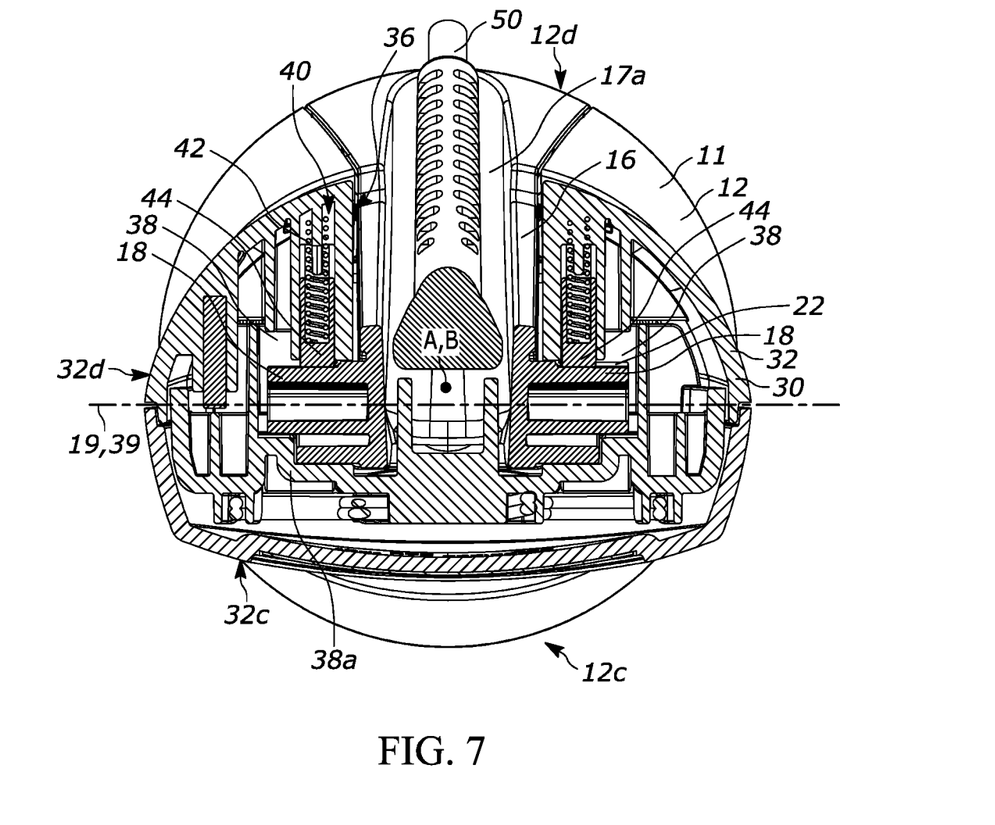
FIG. 7 is a top plan cross-sectional view of the digital barcode scanner of FIGS. 1-6 illustrating a ratchet component of the mechanical linkage in accordance with this disclosure.

As illustrated in FIGS. 2 and 7, the enclosure body 32 defines a rear cutout 36 to accommodate at least a portion of the mechanical linkage 16 and an external data and/or power cable 50. The enclosure body 32 additionally forms a sleeve 38 having a first section 38a carried by the front portion 32c that cooperates with a second section (not illustrated). The sleeve 38 defines a sleeve axis 39. The enclosure body 32 is dimensioned to accommodate all or most of the electronic components used to capture images of the object (e.g., a barcode) within its FOV. For the sake of brevity, these components will not be described in substantial detail herein.

As noted, the mechanical linkage 16 includes two arms 17 that couple the base 11 to the scanner enclosure 30. The arms 17 may be separated by a trough 17b that is dimensioned to accommodate the cable 50. A distal end 17a of each of the arms 17 defines an outwardly-extending ratchet component in the form of ratchet protrusions 18 defining an outer bearing surface 18a and a linkage axis 19. In some examples, the ratchet protrusion 18 further defines an opening 20. As illustrated in FIG. 5, the ratchet protrusion 18 is adapted to be inserted into the sleeve 38 of the enclosure body 32 so that the linkage axis 19 and the sleeve axis 39 are coaxial, thus permitting relative rotation between the base 11 and the scanner enclosure 30. In some examples, the enclosure body 32 may additionally include a finger member (not illustrated) that is inserted into the opening 20 of the ratchet protrusion 18 to assist in relative alignment.

More specifically, the arms 17 are positioned through the rear cutout 36 of the rear portion 32d of the enclosure body 32 such that the arms 17 extend in a direction toward the front portion 32c of the enclosure body 32. Upon coupling the front portion 32c of the enclosure body 32 to the rear portion 32d of the enclosure body 32, the sleeve 38 will at least partially surround and constrain the ratchet protrusion 18 while being dimensioned to allow for relative rotation between the sleeve 38 and the bearing surface 18a of the ratchet protrusion 18. In some aspects, the ratchet protrusion 18 may additionally define any number of stops or protrusions 24 that a surface of the sleeve 38 to limit relative rotation between the mechanical linkage 16 (and thus the base body 12) and the enclosure body 30 in one or more directions.

To operate and/or reposition the imaging reader 10, a user may grasp a portion of the scanner enclosure 30 and urge a portion (e.g., the top portion 32a) of the enclosure body 32 in a desired direction to cause the scanner enclosure 30 to rotate relative to the base body 12 about the linkage axis 19 and the sleeve axis 39 in order to position a barcode or other object within the FOV of the imaging reader 10. The user may engage a trigger or other mechanism that causes the imaging reader 10 to capture an image of the barcode or other object.

As a result of the mechanical coupling between the base 11 and the scanner enclosure 30, the bottom portion 32b of the enclosure body 32 is positioned proximate to the upper portion 12a of the base 11. Specifically, when the base 11 and the scanner enclosure 30 are mechanically coupled, the base center point A and the scanner enclosure center point B are concentric with each other. In some examples, the base center point A and the scanner enclosure center point B may not be concentric with each other, but rather may be positioned within approximately 5 mm of each other. In any of these examples, the base center point A and the scanner enclosure center point B are positioned in a portion of the scanner enclosure 30. In some forms, the base center point A and/or the scanner enclosure center point B may additionally be positioned along the linkage axis 19 and the sleeve axis 39.

Put differently, because the curved scanner enclosure surface 34 of the enclosure body 32 is convex and the curved base surface 14 of the base body 12 is concave (in the illustrated example), the curved scanner enclosure surface 34 may nest within the curved base surface 14. It is understood that nesting of the enclosure body 32 with the base body 12 allows for unobstructed rotation of both components relative to each other. The curved scanner enclosure surface 34 of the enclosure body 32 may be positioned such that an approximately 5 mm gap or clearance is formed therebetween such that the curved scanner enclosure surface 34 of the enclosure body 32 does not frictionally engage the curved base surface 14 of the base body 12.

It is appreciated that in some examples, the curved scanner enclosure surface 34 of the enclosure body 32 may be concave, whereas the curved base surface 14 of the base body 12 may be convex, and thus the curved base surface 14 may nest within the curved scanner enclosure surface 34. In such examples, the base center point A and the scanner enclosure center point B may be positioned in a portion of the base 12 (or a volume below the base 12 if the radius of the sphere is sufficiently large).

It is further appreciated that in examples where the curved base surface 14 is generally cylindrical and thus cylindrical about a base axis (while being either concave or convex) and the curved scanner enclosure surface 34 is generally cylindrical and thus cylindrical about the scanner enclosure axis (while being either convex or concave depending on the curvature of the curved base surface 14), the base axis and the scanner enclosure axis may be either coaxial or positioned within approximately 5 mm of each other. In any of these examples, the base axis and the scanner enclosure axis may pass through a portion of the scanner enclosure 30, the base 12, or a volume below the base 12 depending on the relative curvatures of the curved base surface 14 and the curved scanner enclosure surface 34. In some forms, the base axis and/or the scanner enclosure axis may additionally be coaxial with the linkage axis 19 and the sleeve axis 39.

Returning to the mechanical coupling between the base 11 and the scanner enclosure 30, the ratchet protrusion 18 may define any number of ratchets or detents 22 to allow for selective positioning of the scanner enclosure 30 relative to the base 11. A portion of the enclosure body (e.g., the rear portion 32d) additionally defines a pawl bore 40 to accommodate a resilient member (e.g., a spring) 42 and a pawl member 44. As illustrated in FIGS. 5 and 7, the resilient member 42 urges the pawl member 44 into engagement with the ratchet protrusion 18, whereupon the pawl member 44 may selectively engage with and/or be retained within a desired detent 22.

The resilient member 43 generates a force that gently resists urging or rotation by a user on the enclosure body 32 until the urging force is greater than the engaging force between the detent 22 and the pawl member 44. At this point, relative rotation between the pawl member 44 and the ratchet protrusion 18 causes the pawl member 44 to move into an adjacent detent 22, and may be retained therein until an urging force exerted by the user is again greater than the engaging force between the detent 22 and the pawl member 44. As a result, the enclosure body 32 may be selectively retained at a desired angle or configuration relative to the base body 12.

In some aspects, the imaging reader 10 may include any number of optional arrangements, configurations, and/or components. For example, in some approaches, the rear cutout 36 of the enclosure body may terminate at a cutout wall 37. As illustrated in FIG. 6, the cutout wall 37 may extend between approximately 40° and approximately 60° forward of the mechanical linkage 16 with the linkage axis 19 being a vertex. Because the mechanical linkage 16 extends upwardly from the base body 12 at an angle, the corresponding rear cutout 36 of the enclosure body 32 that accommodates the mechanical linkage may be positioned towards the rear portion 32d of the enclosure body 32. Accordingly, when the scanner enclosure 30 is rotated backwards (such that the front portion 32c of the enclosure body 32 tilts upwardly), the rear cutout 36 will remain substantially or entirely hidden from view by the base body 12.

In some examples, the arrangement of the components of the imaging reader 10 may be reversed. For example, the mechanical linkage may be carried by the enclosure body and may extend downwardly from a front portion thereof to a rear portion and towards the rear portion of the base. In such examples, the base may carry a sleeve (and optionally, ratchet components including a pawl bore, resilient member, and/or pawl member as desired) to accommodate the ratchet protrusion of the mechanical linkage. In such a configuration, depending on the relative curvatures of the curved base surface 14 and the curved scanner enclosure surface 34, the base center point and the scanner enclosure center point (or alternatively, the base axis and the scanner enclosure axis) may be positioned in (or pass through) a portion of the scanner enclosure or the base.

In some approaches, the base may not include a curved base surface. Rather, this surface may be "punched out" such that the base body 12 is in the form of an upright or upwardly extending wall that defines an opening. Because the mechanical linkage 16 and the sleeve 38 act to couple the base 11 to the scanner enclosure 30, in such an arrangement, the rear portion 32d (specifically, the curved scanner enclosure surface 34) of the enclosure body 32 simply is disposed within the opening defined by the upwardly extending wall.

Specifically, the upright wall may terminate within approximately 5 mm of the scanner enclosure surface 34 so as to minimize a gap between the two components.

The upwardly extending wall may be continuous or segmented into a number of discrete sections. When the curved scanner enclosure surface 34 is generally spherical in shape, the opening defined by the upwardly extending wall may be generally circular in shape. In examples where the curved scanner enclosure surface 34 is generally cylindrical in shape, the opening defined by the upwardly extending wall may be generally cylindrical in shape to accommodate the curved scanner enclosure surface 34.

So configured, the imaging reader 10 has the visual appearance of a ball and socket connection, but uses a ratcheting mechanism to selectively permit relative rotation. As a result, a robust rotational mechanism may be used while maintaining minimal gaps or clearances between components and surfaces that move relative to each other (i.e., the upper portion 12a of the base body 12 and the bottom portion 32b of the enclosure body 32. Accordingly, moving components are not exposed to elements that may impede proper tilting or rotation of the device, and the likelihood of a user's fingers becoming pinched are reduced.

In any or all of these implementations, the imaging reader 10 may be alternately operable in at least one of a manual mode or a presentation or hands-free mode. The reader 10 may be jointly lifted as a unit off the support surface, and held in an operator's hand, and used in a handheld or manual mode of operation in which a trigger mechanism is manually actuated and depressed to initiate reading of symbol/document, such as a barcode on a product, in a range of working distances relative to a window. In a presentation or hands-free mode of operation, the reader 10 is jointly mounted on the support surface in which symbol/document targets are presented in a range of working distances relative to the window for reading.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A barcode scanner assembly for capturing at least one image of an object appearing in a field of view (FOV), the barcode scanner assembly comprising:
    a base including a front portion, a rear portion, and a mechanical linkage extending from the rear portion of the base at an upward angle and defining a linkage axis;
    a scanner enclosure being mechanically coupled to the base and pivotable about the linkage axis, the scanner enclosure including a top portion, a bottom portion opposite the top portion, a front portion, and a rear portion, the bottom portion of the scanner enclosure being positioned proximate to the base, the bottom portion of the scanner enclosure including an aperture configured to receive the mechanical linkage;
    wherein the aperture of the bottom portion of the scanner enclosure is defined by an aperture wall that extends approximately 50° forward of the mechanical linkage with the linkage axis being a vertex, and
    wherein the mechanical linkage includes a ratchet member defining a bearing surface having a plurality of detents and a spring loaded pawl that selectively engages the plurality of detents to allow the base and the scanner enclosure to be positioned in a plurality of configurations relative to each other.

2. The barcode scanner assembly of claim 1, wherein when the base is coupled to the scanner enclosure, the mechanical linkage extends in a direction toward the front portion of the scanner enclosure.

3. The barcode scanner assembly of claim 1, wherein the mechanical linkage extends from the rear portion of the base at an upward angle between approximately 40° and approximately 50° relative to a longitudinal axis of the scanner enclosure body.

4. The barcode scanner assembly of claim 1, wherein the mechanical linkage carries the ratchet member and the scanner enclosure carries the spring loaded pawl.

5. The barcode scanner assembly of claim 1, wherein the mechanical linkage further includes at least one stop to limit relative rotation between the scanner enclosure and the base.

6. The barcode scanner assembly claim 1, further comprising a weep hole disposed on the base.

* * * * *